United States Patent
Cho et al.

(10) Patent No.: US 7,525,619 B2
(45) Date of Patent: Apr. 28, 2009

(54) APPARATUS FOR RUBBING AN ALIGNMENT LAYER OF A LIQUID CRYSTAL DISPLAY DEVICE COMPRISING A ROLLER PROVIDED WITH A PLURALITY OF HOLES

(75) Inventors: Heung Lyul Cho, Suwon-si (KR); Soon Sung Yoo, Gunpo-si (KR); Oh Nam Kwon, Yongin-si (KR); Seung Hee Nam, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 295 days.

(21) Appl. No.: 11/410,852

(22) Filed: Apr. 26, 2006

(65) Prior Publication Data

US 2006/0274245 A1  Dec. 7, 2006

(30) Foreign Application Priority Data

Jun. 1, 2005  (KR)  .................. 10-2005-0046724

(51) Int. Cl.
*G02F 1/1337*  (2006.01)
(52) U.S. Cl. ................... 349/126; 349/187; 15/230
(58) Field of Classification Search .................. 349/126
See application file for complete search history.

(56) References Cited

U.S. PATENT DOCUMENTS

| 2002/0027628 A1* | 3/2002 | Ishizuka et al. | 349/118 |
| 2002/0131000 A1* | 9/2002 | Koike et al. | 349/126 |
| 2003/0093172 A1* | 5/2003 | Lee | 700/119 |
| 2003/0160926 A1* | 8/2003 | Horiuchi | 349/124 |
| 2004/0246421 A1* | 12/2004 | Inoue et al. | 349/129 |
| 2005/0007502 A1* | 1/2005 | Lee | 349/1 |

* cited by examiner

*Primary Examiner*—Andrew Schechter
*Assistant Examiner*—Charles Chang
(74) *Attorney, Agent, or Firm*—McKenna Long & Aldridge LLP

(57) ABSTRACT

An apparatus and method for rubbing an alignment layer of an LCD device is disclosed. The alignment layer is rubbed over an entire surface of a substrate at uniform pressure and dust or particle is not adsorbed into the alignment layer during rubbing process. The apparatus for rubbing an alignment layer of an LCD device includes a rubbing means to rub the alignment layer while the rubbing means is rotated along one direction to contact a surface of the alignment layer formed on a substrate, and a liquid jet to jet liquid when the alignment layer is rubbed by the rubbing means.

10 Claims, 9 Drawing Sheets

APPARATUS FOR RUBBING AN ALIGNMENT LAYER OF A LIQUID CRYSTAL DISPLAY DEVICE COMPRISING A ROLLER PROVIDED WITH A PLURALITY OF HOLES

This application claims the benefit of Korean Patent Application No. 10-2005-0046724, filed on Jun. 1, 2005, which is hereby incorporated by reference for all purposes as if fully set forth herein.

BACKGROUND OF THE INVENTION

1. Field of the Invention

The present invention relates to a method for fabricating a liquid crystal display (LCD) device. More particularly, the present invention relates to an apparatus and method for rubbing an alignment layer of an LCD device, in which rubbing uniformity of the alignment layer is improved.

2. Discussion of the Related Art

Generally, LCD devices are widely used for clocks, calculators, monitors for PCs, notebook computers, TVs, monitors for spacecraft, PDAs, cellular phones, etc. LCD devices are used because of their characteristics and they have the advantages of low voltage driving, low power consumption, full color, thin profile, and lightness in weight.

LCD devices may be classified into LCD panels for displaying images and circuits for driving the LCD panels.

An LCD panel may include a thin film transistor (TFT) substrate provided with a TFT array, a color filter (CF) substrate provided with a color filter array, and a liquid crystal layer formed between the two substrates. Alignment layers may be respectively provided on each surface of the TFT substrate and the CF substrate to face each other. The alignment layers determine an alignment direction of the liquid crystal layer.

The TFT substrate may include a plurality of gate lines arranged along a first direction at fixed intervals and a plurality of data lines arranged along a second direction perpendicular to the first direction at fixed intervals to define pixel regions. The TFT substrate may also include a plurality of pixel electrodes formed in each of the pixel regions to display images and a plurality of thin film transistors that may be switched on/off by driving signals of the gate lines to transfer image signals of the data lines to the respective pixel electrodes.

The CF substrate may include a black matrix layer that prevents light from reaching the pixel regions, R/G/B color filter layers corresponding to the respective pixel regions to display various colors, and a common electrode formed on the entire surface including the color filter layers. The common electrode may be formed on the TFT substrate in an in-plan switching (IPS) mode LCD device. An alignment process may then be performed for the alignment layers of the TFT substrate and the CF substrate to arrange liquid crystal molecules.

An example of the alignment process includes a rubbing method in which a surface of an alignment layer is rubbed with a rubbing cloth. The rubbing cloth is adhered to an outer circumference of a roller. If the roller is rotated, the rubbing cloth adhered to the outer circumference of the roller contacts the surface of the alignment layer so that the surface of the alignment layer is rubbed with the rubbing cloth.

If liquid crystal molecules are arranged along a direction of the alignment layer rubbed with the rubbing cloth, it may be possible to obtain uniform display characteristics.

FIG. 1 is an elevational view illustrating a portion of a related art LCD device.

As shown in FIG. 1, an upper substrate 10 and a lower substrate 30 are spaced apart from each other at a certain interval and face each other. A liquid crystal layer 50 is interposed between the upper and lower substrates 10 and 30.

The lower substrate 30 includes a plurality of gate lines 32, a plurality of data lines 34, and a plurality of TFTs T. The gate lines 32 cross the data lines 34. The TFTs are formed at regions where the gate lines 32 cross the data lines 34.

Also, pixel regions P are defined by the regions where the gate lines 32 cross the data lines 34. The pixel regions P are provided with pixel electrodes 46 connected with the TFTs T.

Furthermore, each of the TFTs T includes a gate electrode (not shown) and source and drain electrodes (not shown). A gate voltage may be applied to the gate electrode and a data voltage may be applied to the source and drain electrodes. Each of the TFTs T also includes a channel (not shown) for controlling the voltages to be on/off using the voltage difference between the gate voltage and the data voltage.

The upper substrate 10 includes a color filter layer 12 and a common electrode 16. The color filter layer 12 includes a color filter (not shown) and a black matrix (not shown). The color filter only transmits light corresponding to a specific wavelength. The black matrix is arranged at the boundary of the color filter and shields light from the pixel regions P of the lower substrate 30, where alignment of the liquid crystal molecules is not controlled.

An upper polarizing plate 52 and a lower polarizing plate 54 are respectively arranged outside the upper and lower substrates 10 and 30 and transmit light only parallel to a polarizing axis. A separate light source, i.e., a back light, is arranged below the lower polarizing plate 54.

A related art method for rubbing an alignment layer of an LCD device will be described with reference to the accompanying drawings.

FIGS. 2A to 2C illustrate a related art process for rubbing an alignment layer. FIG. 2A is a perspective view illustrating an apparatus for rubbing an alignment layer, FIG. 2B is a side view illustrating an apparatus for rubbing an alignment layer, and FIG. 2C is a plan view illustrating an apparatus for rubbing an alignment layer.

As shown in FIGS. 2A to 2C, the related art apparatus for rubbing an alignment layer includes a cylindrical rubbing roller 61, a rubbing cloth 62 adhered to an outer circumference of the rubbing roller 61 using a double-sided tape, a rotary shaft 63 connected with both sides of the rubbing roller 61 and rotated along one direction while supporting the rubbing roller 61, and a rotary motor 66 connected with the rotary shaft 63 to rotate the rotary shaft 63.

A related art method for rubbing an alignment layer using the aforementioned rubbing apparatus will now be described.

A substrate 64 provided with an alignment layer 65 is loaded on a stage 60, and a driving roller is rotated by a driving motor (not shown) so that the stage 60 advances along an arrow. The driving motor is to move the stage 60 in one direction.

The rubbing roller 61 connected with the rotary shaft 63 contacts the alignment layer 65 of the substrate 64 loaded on the stage 60 at the bottom, and forms a groove on a surface of the alignment layer 65 while being rotated by the rotary motor 66 in one direction.

That is, the related art rubbing process is performed in such a manner that the rubbing roller 61 wound with the rubbing cloth 62 is rotated to rub the surface of the alignment layer 65 using physical friction.

In order to obtain uniform display characteristics in the LCD device, it is important that the groove is uniformly formed in a wide area. The groove can uniformly be formed by rubbing the surface of the alignment layer with the rubbing cloth at uniform pressure and speed to align a high molecular chain on the surface of the alignment layer in a certain direction.

The aforementioned related art method for rubbing an alignment layer uniformly arranges the liquid crystal molecules by rubbing the alignment layer with the rubbing cloth. The related art method also uniformly displays images on the entire surface of the LCD device by arranging the alignment layer in one direction.

However, with the trend towards larger sized LCD devices, LCD devices having dimensions of 1100 mm or greater have been commercially used. Under these circumstances, the rubbing roller used for the rubbing process is contrived to have a large size.

In this case, as shown in FIG. 3, a middle portion in a longitudinal direction of the rubbing roller 61 is bent by self-load as the rubbing roller 61 of metal material has a longer cylindrical length. Also, the alignment layer 65 formed on the substrate 64 is rubbed by uneven pressure. As a result, display quality is deteriorated over the entire surface of the LCD device.

Furthermore, for the alignment process, the rubbing roller 61 is adhered with the rubbing cloth 62 using a general adhesive. Furthermore, static electricity occurs due to friction between the rubbing cloth 62 and the alignment layer 65. Friction is caused by rotation of the rubbing roller 61. For this reason, dust, dirt in the air, and/or particles generated from the rubbing cloth 62 is adsorbed into the alignment layer 65, thereby causing a pin hole.

SUMMARY OF THE INVENTION

Accordingly, the present invention is directed to an apparatus and method for rubbing an alignment layer of an LCD device, which substantially obviates one or more problems due to limitations and disadvantages of the related art.

An advantage of the present invention is to provide an apparatus and method for rubbing an alignment layer of an LCD device, in which the alignment layer is rubbed over an entire surface of a substrate at uniform pressure.

Another advantage of the present invention is to provide an apparatus and method for rubbing an alignment layer of an LCD device, in which dust and/or particle is not adsorbed into the alignment layer during the rubbing process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, an apparatus for rubbing an alignment layer of an LCD device includes a rubbing means to rub the alignment layer while the rubbing means is rotated along one direction to contact a surface of the alignment layer formed on a substrate, and a liquid jet to jet liquid when the alignment layer is rubbed by the rubbing means.

In another aspect of the present invention, a method for rubbing an alignment layer of an LCD device includes forming the alignment layer on a substrate, rubbing the alignment layer by rotating a rubbing roller adhered with a rubbing cloth while moving the substrate provided with the alignment layer in one direction, and simultaneously jetting liquid using a liquid jet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principles of the invention. In the drawings.

DETAILED DESCRIPTION OF THE INVENTION

Reference will now be made in detail to exemplary embodiments of the present invention, examples of which are illustrated in the accompanying drawings. Wherever possible, the same reference numbers will be used throughout the drawings to refer to the same or similar parts.

Figure 1:
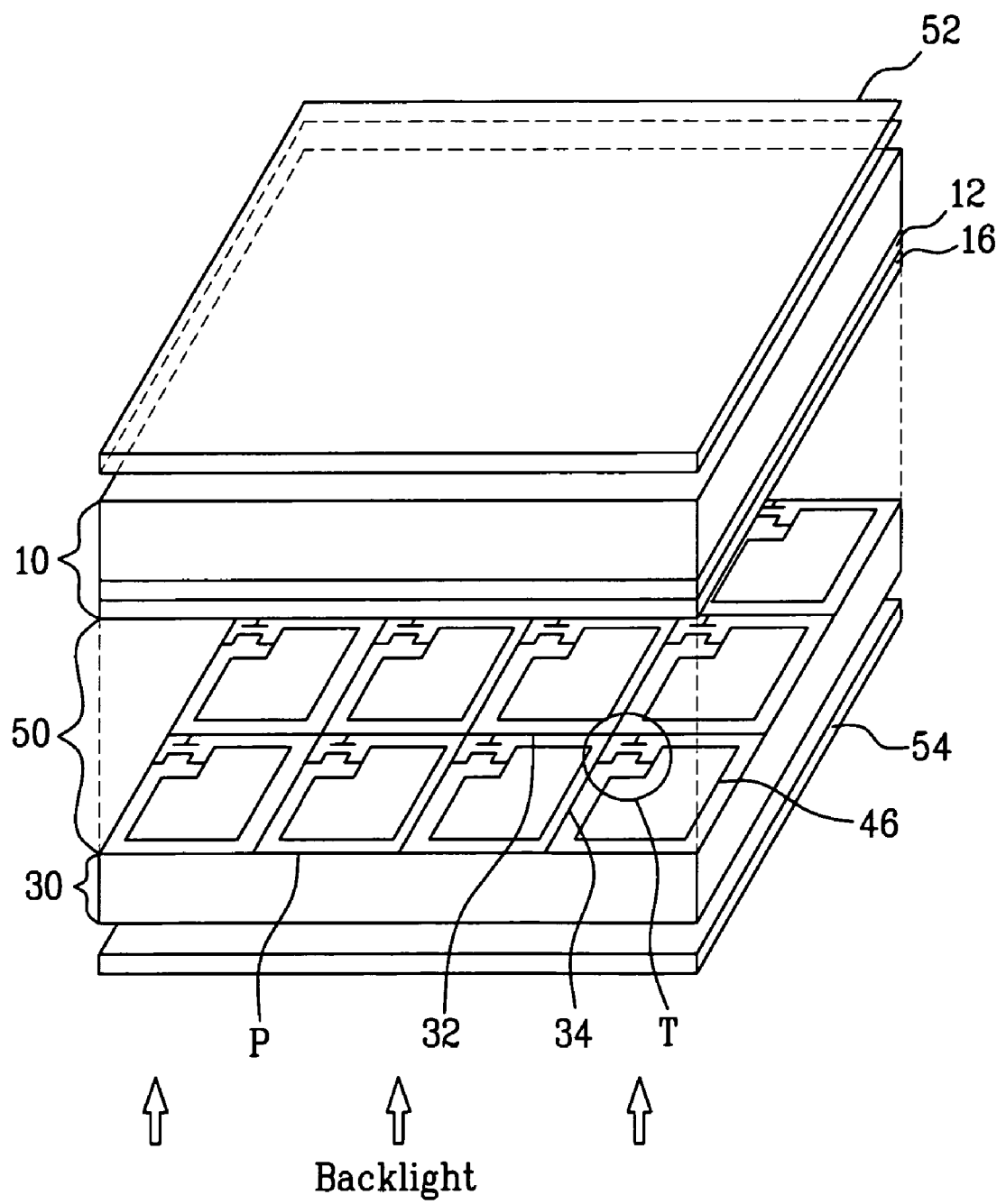
FIG. 1 is an elevational view illustrating a portion of a related art LCD device.
Figure 2A:
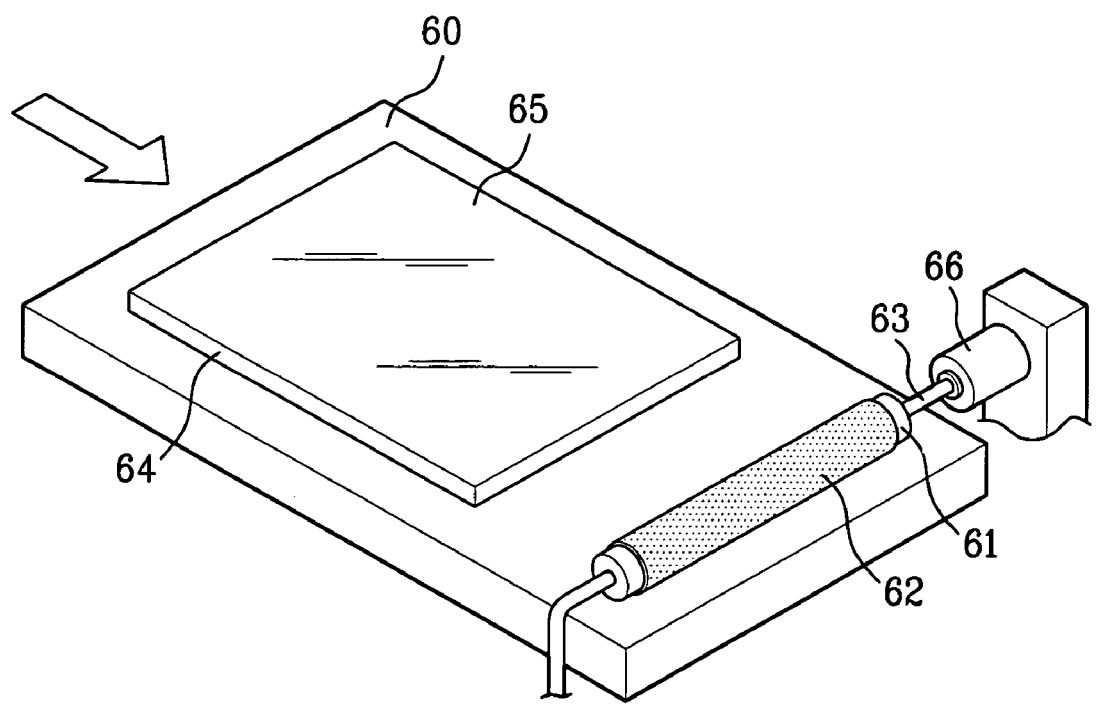
FIGS. 2A to 2C illustrate a related art process for rubbing an alignment layer.
Figure 2B:
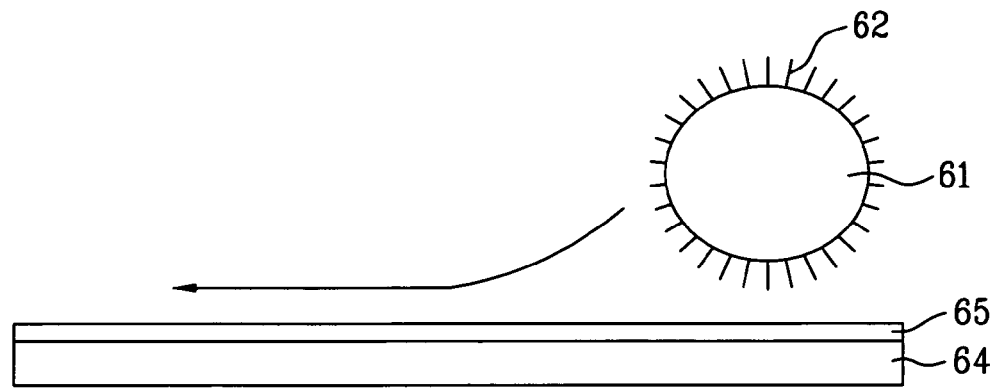
Figure 2C:
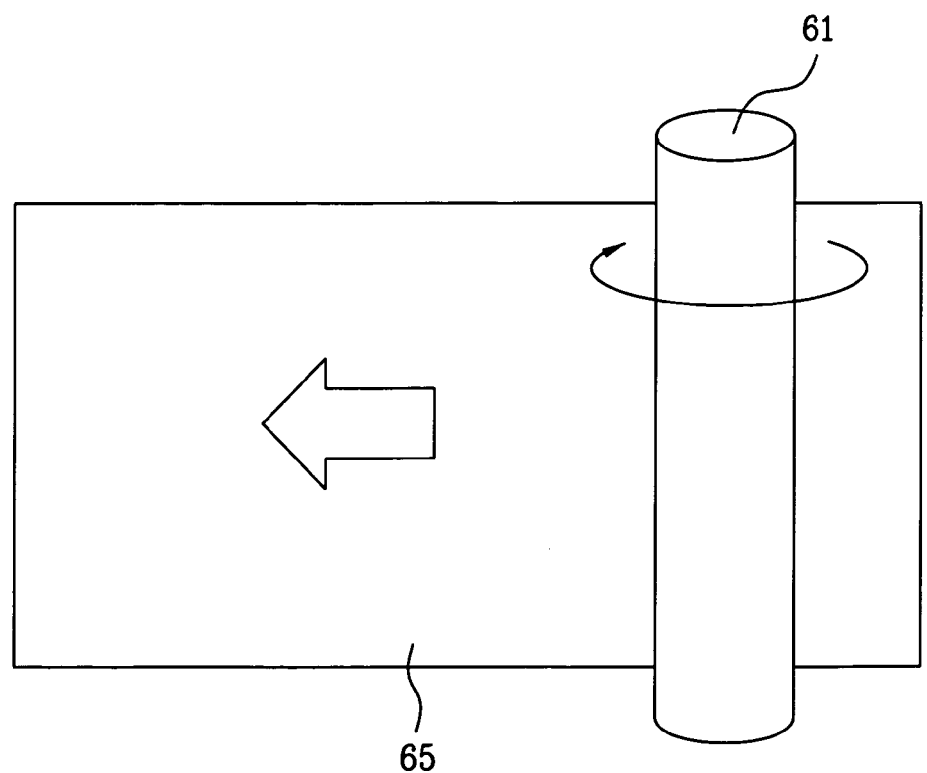
Figure 3:
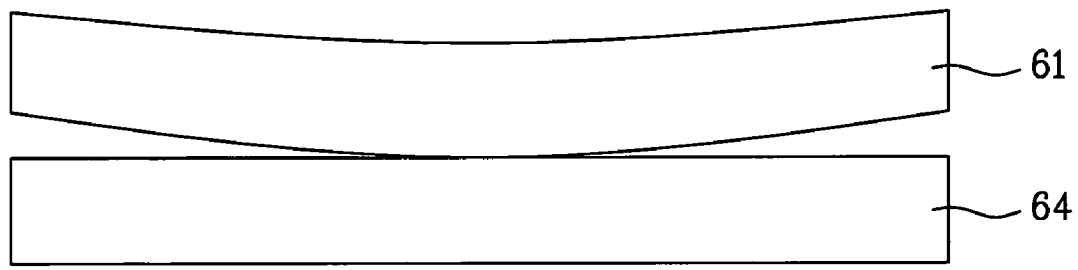
FIG. 3 illustrates problems caused by bending of a middle portion of a rubbing roller in a related art apparatus for rubbing an alignment layer.
Figure 4:
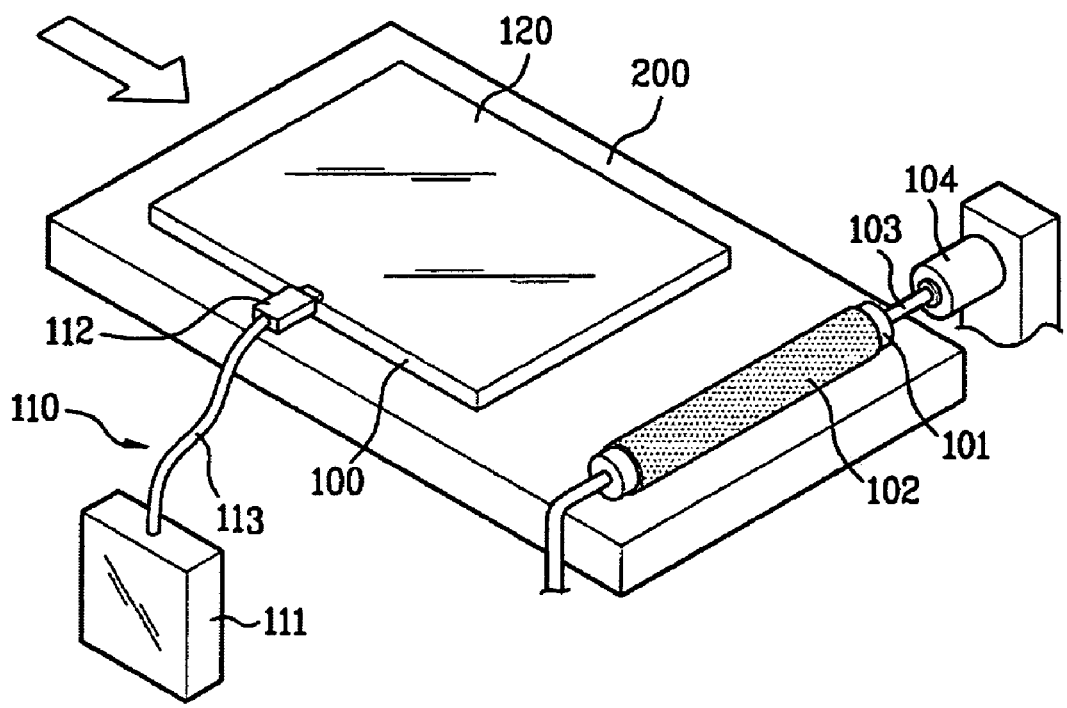
FIG. 4 illustrates an apparatus for rubbing an alignment layer of an LCD device according to a first exemplary embodiment of the present invention.

FIG. 4 illustrates an apparatus for rubbing an alignment layer of an LCD device according to a first exemplary embodiment of the present invention.

As shown in FIG. 4, the apparatus for rubbing an alignment layer of an LCD device according to a first exemplary embodiment of the present invention includes a cylindrical rubbing roller 101, a rubbing cloth 102 that may be adhered to an outer circumference of the rubbing roller 101 using a double-sided tape, a rotary shaft 103 connected with both sides of the rubbing roller 101, a rotary motor 104 connected with the rotary shaft 103, and a liquid jet 110. The rotary shaft 103 may rotate along one direction while supporting the rubbing roller 101 and the rotary motor 104 may rotate the rotary shaft 103 along one direction. The liquid jet 110 may jet liquid onto a substrate 100 during rotation of the rubbing roller 101.

The liquid jet 110 may include a liquid storage tank 111 storing liquid therein, a jet nozzle 112 granulating and jetting the liquid stored in the liquid storage tank 111 at a uniform size, and a pipe 113 connecting the liquid storage tank 111 with the jet nozzle 112.

Also, the rubbing roller 101 may include an inner cylinder of carbon fiber reinforcing plastic and an outer cylinder of plated stainless steel. A rubbing cloth is adhered to a surface of the plated stainless steel using a conductive adhesive.

An exemplary method for rubbing an alignment layer using the aforementioned apparatus will now be described.

The substrate 100 provided with an alignment layer 120 is loaded on a stage 200, and a driving roller is rotated by a driving motor (not shown) so that the stage 200 advances along one direction. The driving motor moves the stage 200 in one direction.

The rubbing roller 101 connected with the rotary shaft 103 contacts the alignment layer 120 of the substrate 100 loaded on the stage 200 at the bottom. The rotary shaft 103 is rotated in one direction by the rotary motor 104 to rotate the rubbing roller 101. The rubbing cloth 102 adhered to the rubbing roller 101 forms a groove on a surface of the alignment layer 120.

The rubbing process is performed in such a manner that the rubbing roller 101 wound by the rubbing cloth 102 is rotated to rub the surface of the alignment layer 120 using physical friction.

Water or isopropylalcohol (IPA) may be used as the liquid jetted from the liquid jet 110.

As described above, the rubbing process is performed in such a manner that a groove is formed on the surface of the alignment layer 120 using the rubbing apparatus while the liquid is being jetted onto the entire surface of the substrate 100 using the liquid jet 110. The middle portion of the rubbing roller 101 is filled with the liquid even if it is bent. Therefore, it is possible to uniformly perform the rubbing process.

In the aforementioned liquid jet 110, the liquid storage tank 111 may be externally supplied with $N_2$ gas. The liquid may then be supplied to the jet nozzle 112 through the pipe 113 if the pressure inside the liquid storage tank 111 reaches a maximum caused by the $N_2$ gas.

Subsequently, the liquid supplied to the jet nozzle 112 is granulated through a filter that may have a plurality of holes of several tens of microns. The liquid is then jetted onto the alignment layer 120 along with the $N_2$ gas.

Figure 5:
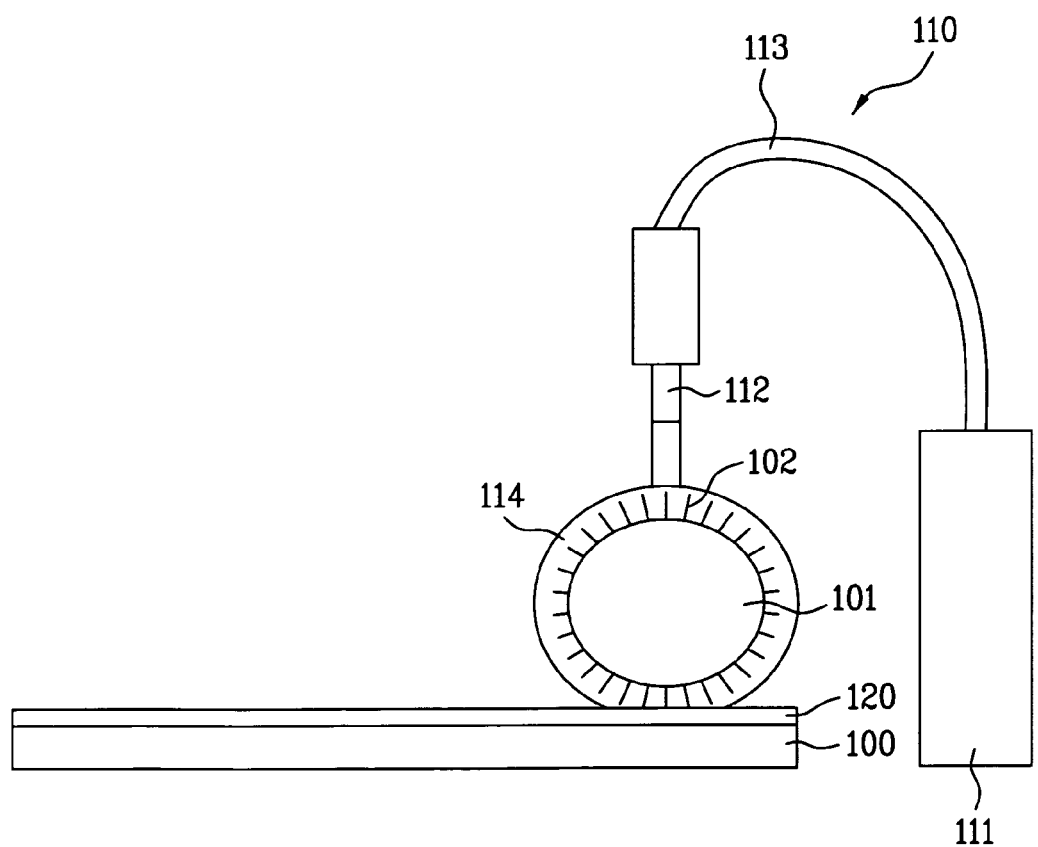
FIG. 5 illustrates an apparatus for rubbing an alignment layer of an LCD device according to a second exemplary embodiment of the present invention.

FIG. 5 illustrates an apparatus for rubbing an alignment layer of an LCD device according to a second exemplary embodiment of the present invention.

In the apparatus for rubbing an alignment of an LCD device according to a first exemplary embodiment of the present invention, the liquid jet 110 jets the liquid onto the substrate 100 provided with the alignment layer 120. In the apparatus for rubbing an alignment of an LCD device according to a second exemplary embodiment of the present invention, the liquid jet 110 jets the liquid onto the rubbing roller 101 adhered with the rubbing cloth 102.

As shown in FIG. 5, the apparatus for rubbing an alignment layer of an LCD device according to a second exemplary embodiment of the present invention includes a cylindrical rubbing roller 101, a rubbing cloth 102 that may be adhered to an outer circumference of the rubbing roller 101 using a double-sided tape, and a liquid jet 110. The liquid jet 110 jets liquid 114 onto the rubbing roller 101.

The liquid jet 110 includes a liquid storage tank 111 storing the liquid 114 therein, a jet nozzle 112 granulating and jetting the liquid 114 stored in the liquid storage tank 111 at a uniform size, and a pipe 113 connecting the liquid storage tank 111 with the jet nozzle 112.

A method for rubbing an alignment layer using the aforementioned apparatus according to a second exemplary embodiment of the present invention will now be described.

The substrate 100 provided with the alignment layer 120 is loaded on a stage 200, and a driving roller is rotated by a driving motor (not shown) so that the stage 200 advances along one direction. The driving motor moves the stage 200 in one direction.

The rubbing roller 101 connected with the rotary shaft 103 contacts the alignment layer 120 of the substrate 100 loaded on the stage 200 at the bottom. The rotary shaft 103 is rotated in one direction by the rotary motor 104 to rotate the rubbing roller 101. The rubbing cloth 102 adhered to the rubbing roller 101 forms a groove on a surface of the alignment layer 120.

The rubbing process is performed in such a manner that the liquid 114 is jetted onto the rubbing roller 101 provided with the rubbing cloth 102 using the liquid jet 110 when the alignment layer 120 is rubbed using the rubbing apparatus according to a second exemplary embodiment of the present invention.

Water or isopropylalcohol (IPA) may be used as the liquid jetted from the liquid jet 110.

As described above, the rubbing process is performed in such a manner that a groove is formed on the surface of the alignment layer 120 using the rubbing apparatus while the liquid is being jetted onto the rubbing roller 101 adhered with the rubbing cloth 102 using the liquid jet 110. The middle portion of the rubbing roller 101 is filled with the liquid 114 even if it is bent. Therefore, it is possible to uniformly perform the rubbing process.

In the aforementioned liquid jet 110, the liquid storage tank 111 may be externally supplied with $N_2$ gas. The liquid may then be supplied to the jet nozzle 112 through the pipe 113 if the pressure inside the liquid storage tank 111 reaches a maximum pressure caused by the $N_2$ gas.

Subsequently, the liquid supplied to the jet nozzle 112 is granulated through a filter that may have a plurality of holes of several tens of microns. The liquid is then jetted onto the alignment layer 120 along with the $N_2$ gas.

Figure 6A:
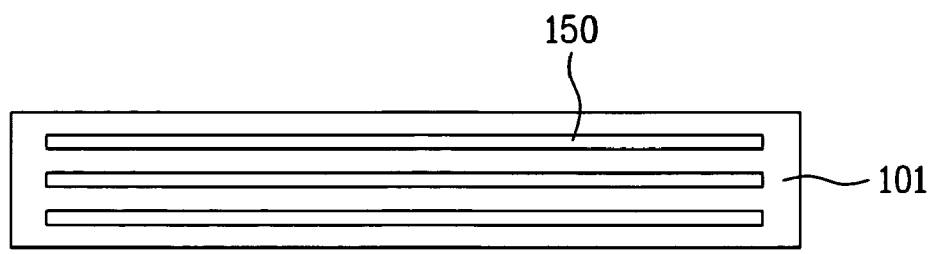
FIGS. 6A and 6B are side views illustrating a rubbing roller in an apparatus for rubbing an alignment layer of an LCD device according to a third exemplary embodiment of the present invention.
Figure 6B:
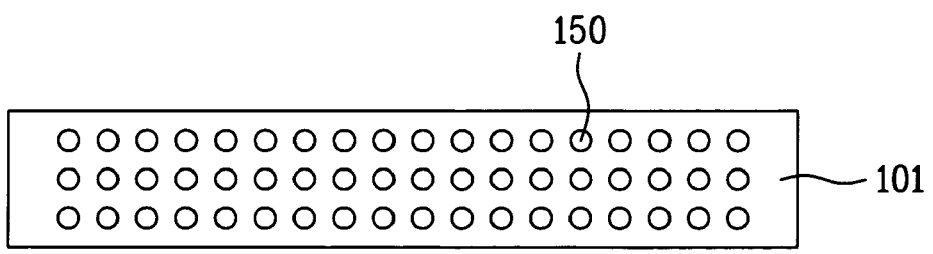
Figure 7A:
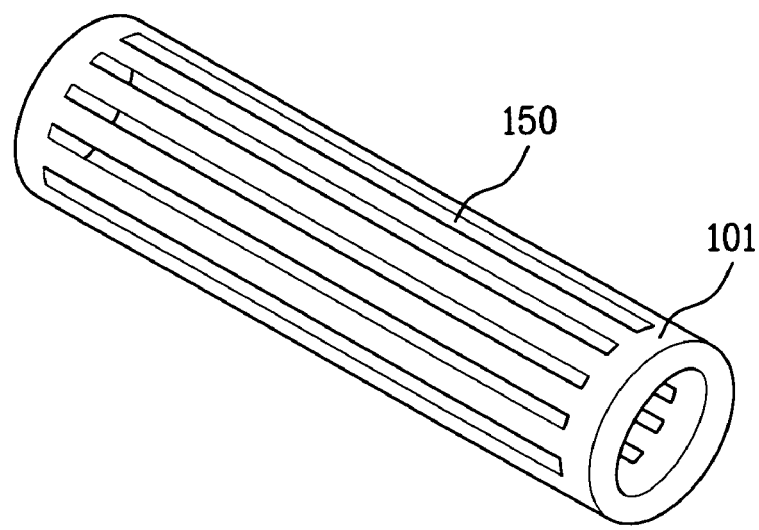
FIGS. 7A and 7B are perspective views illustrating a rubbing roller in an apparatus for rubbing an alignment layer of an LCD device according to the third exemplary embodiment of the present invention.
Figure 7B:
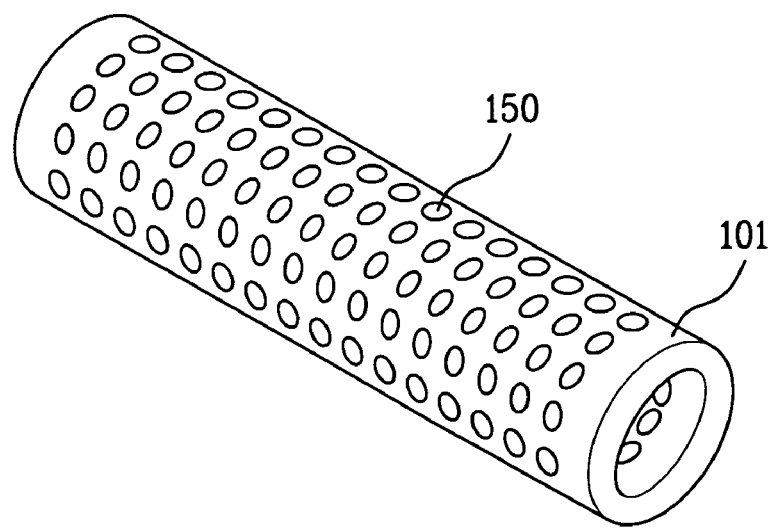

FIGS. 6A and 6B are side views illustrating a rubbing roller in an apparatus for rubbing an alignment layer of an LCD device according to a third exemplary embodiment of the present invention, and FIGS. 7A and 7B are perspective views illustrating a rubbing roller in an apparatus for rubbing an alignment layer of an LCD device according to the third exemplary embodiment of the present invention.

In the apparatus for rubbing an alignment of an LCD device according to the first and second exemplary embodiments of the present invention, the liquid is jetted onto the substrate 100 provided with the alignment layer 120 or the rubbing roller 101 adhered with the rubbing cloth 102 through the jet nozzle 112 of the liquid jet 110. In the apparatus for rubbing an alignment of an LCD device according to a third exemplary embodiment of the present invention, the rubbing roller 101 may be provided with a plurality of holes 150 and may be directly connected with the pipe 113 to supply the liquid to the substrate 100 through the holes 150.

As shown in FIGS. 6A and 7A, the cylindrical rubbing roller 101 is provided with a plurality of linear holes 150 formed at constant intervals.

Also, as shown in FIGS. 6B and 7B, the cylindrical rubbing roller 101 is provided with a plurality of round holes 150 formed at constant intervals.

The holes are not limited to linear or round shapes. The holes may have rectangular or polygonal shapes as well as other shapes.

The rubbing cloth 102 may be adhered to the rubbing roller 101 having the plurality of holes 150 using a double-sided tape.

A method for rubbing an alignment layer using the aforementioned apparatus according to a third exemplary embodiment of the present invention will now be described.

The substrate 100 provided with the alignment layer 120 is loaded on a stage 200, and a driving roller is rotated by a driving motor (not shown) so that the stage 200 advances along one direction. The driving motor moves the state 200 in one direction.

The rubbing roller 101 connected with the rotary shaft 103 contacts the alignment layer 120 of the substrate 100 loaded on the stage 200 at the bottom. The rotary shaft 103 is rotated in one direction by the rotary motor 104 to rotate the rubbing roller 101. The rubbing cloth 102 adhered to the rubbing roller 101 forms a groove on a surface of the alignment layer 120.

The rubbing process is performed in such a manner that the cylindrical rubbing roller 101 wound by the rubbing cloth 102, which may be made of nylon, is rotated to rub the surface of the alignment layer 120 using physical friction.

The rubbing process is performed in such a manner that liquid is injected into the rubbing roller 101 provided with the plurality of holes 150 using the liquid jet 110 when the alignment layer 120 is rubbed using the rubbing apparatus according to a third exemplary embodiment of the present invention.

Water or isopropylalcohol (IPA) may be used as the liquid jetted from the liquid jet 110.

As described above, the rubbing process is performed in such a manner that if the liquid 114 is injected into the rubbing roller 101 using the liquid jet 110, the liquid flows toward the substrate 100 through the holes 150 formed in the rubbing roller 101 to form a groove on the surface of the alignment layer 120. The middle portion of the rubbing roller 101 is filled with the liquid 114 even if it is bent. Therefore, it is possible to uniformly perform the rubbing process.

In the aforementioned liquid jet 110, the liquid storage tank 111 may be externally supplied with $N_2$ gas. The liquid may then be supplied to the rubbing roller 101 through the pipe 113 if the pressure inside the liquid storage tank 111 reaches a maximum caused by the $N_2$ gas.

Figure 8:
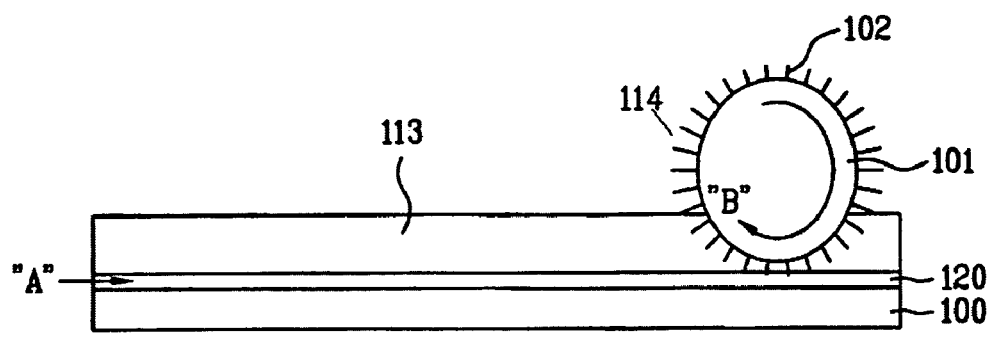
FIG. 8 illustrates a method for rubbing an alignment layer of an LCD device according to another exemplary embodiment of the present invention.

FIG. 8 illustrates a method for rubbing an alignment layer of an LCD device according to another exemplary embodiment of the present invention.

As shown in FIG. 8, the rubbing process of the alignment layer 120 formed on the substrate 100 is performed using the rubbing cloth 102 adhered to the rubbing roller 101 while the liquid 114 is being jetted onto the substrate 100. The rubbing process may determine the alignment direction of the liquid crystal.

An arrow A represents a movement direction of the substrate 100, and an arrow B represents a rotational direction of the rubbing roller 101.

Figure 9:
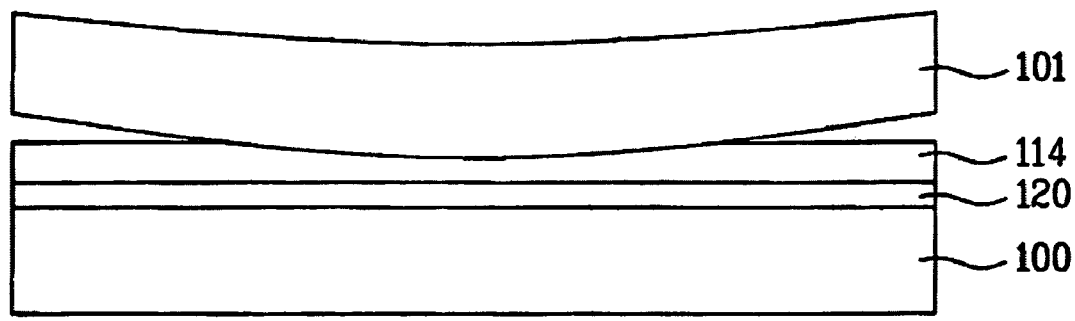
FIG. 9 illustrates a rubbing process performed when a middle portion of a rubbing roller bends when an alignment layer of an LCD according to an exemplary embodiment of the present invention is rubbed.

FIG. 9 illustrates a rubbing process performed when a middle portion of a rubbing roller is bent when an alignment layer of an LCD according to an exemplary embodiment of the present invention is rubbed.

As shown in FIG. 9, if the middle portion of the rubbing roller 101 is downwardly bent by gravity, it is filled with the liquid 114 so as to obtain uniform alignment.

As described above, the apparatus and method for rubbing an alignment layer of an LCD device includes the following advantages.

The rubbing process may be performed after the liquid is jetted onto the substrate or the rubbing cloth. The middle portion of the rubbing roller is filled with the liquid even if it is downwardly bent. Therefore, it is possible to uniformly perform the rubbing process and to prevent static electricity from occurring between the rubbing cloth and the alignment layer. Also, it is possible to reduce a defect caused by particles generated from the rubbing cloth.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus for rubbing an alignment layer of an LCD device comprising:
   a rubbing means to rub the alignment layer while the rubbing means is rotated along one direction to contact a surface of the alignment layer formed on a substrate, wherein the rubbing means includes a cylindrical rubbing roller provided with a plurality of holes, a rubbing cloth adhered to an outer circumference of the rubbing roller, a rotary shaft connected with the rubbing roller to rotate the rubbing roller, and a rotary motor, wherein the rubbing roller includes an inner cylinder of carbon fiber reinforcing plastic and an outer cylinder of plated stainless steel; and
   a liquid jet to jet liquid onto the rubbing roller when the alignment layer is rubbed by the rubbing means, wherein the liquid jetted from the liquid jet was supplied to the alignment layer through the holes of the rubbing roller.

2. The apparatus as claimed in claim 1, wherein the liquid jet includes a liquid storage tank to store the liquid therein, a jet nozzle to granulate and to jet the liquid stored in the liquid storage tank at a uniform size, and a pipe connecting the liquid storage tank with the jet nozzle.

3. The apparatus as claimed in claim 2, wherein the liquid storage tank is supplied with $N_2$ gas.

4. The apparatus as claimed in claim 1, wherein the rubbing cloth is made of one of rayon and nylon.

5. The apparatus as claimed in claim 1, wherein the rubbing cloth is adhered to an outer circumference of the rubbing roller using a conductive adhesive or a double-sided tape.

6. The apparatus as claimed in claim 1, wherein the holes are formed in one of a linear shape and a round shape.

7. The apparatus as claimed in claim 1, wherein the holes are formed in one of a rectangular shape and a polygonal shape.

8. The apparatus as claimed in claim 1, wherein the rotary shaft is connected with both sides of the rubbing roller.

9. The apparatus as claimed in claim 1, wherein the liquid is jetted onto the substrate.

10. The apparatus as claimed in claim 1, wherein the liquid is jetted onto the rubbing means.

* * * * *